United States Patent [19]

Nemoto et al.

[11] Patent Number: 5,229,340
[45] Date of Patent: Jul. 20, 1993

[54] MANUFACTURE OF MGO-BASED BETA"-ALUMINA SINTERED BODIES

[75] Inventors: Hiroshi Nemoto, Nagoya; Tomonori Takahashi, Chita, both of Japan

[73] Assignee: NGK Insulators, Ltd., Japan

[21] Appl. No.: 630,211

[22] Filed: Dec. 19, 1990

[30] Foreign Application Priority Data

Jan. 29, 1990 [JP] Japan .................. 2-18484

[51] Int. Cl.$^5$ .............................. C04B 75/44
[52] U.S. Cl. .................... 501/119; 501/153; 501/127
[58] Field of Search .......... 501/183, 127, 119; 429/193; 423/600

[56] References Cited

U.S. PATENT DOCUMENTS

| | | | |
|---|---|---|---|
| 3,895,963 | 7/1975 | McGowan et al. | 136/153 |
| 3,903,225 | 9/1975 | Jones et al. | 501/153 X |
| 3,959,022 | 5/1976 | DeJonghe et al. | 429/193 |
| 4,151,235 | 4/1979 | May et al. | 501/153 X |
| 4,307,138 | 12/1981 | Powers et al. | 429/193 X |
| 4,732,741 | 3/1988 | Duncan et al. | 423/600 |
| 5,032,570 | 7/1991 | Ogata et al. | 501/94 X |

FOREIGN PATENT DOCUMENTS 52-8842 11/1977 Japan .
1375167 11/1974 United Kingdom .
2237801 5/1991 United Kingdom .

OTHER PUBLICATIONS

Petlatsky and Nicholson, The Relative Stability of Spray-Frozen Freeze Stored $\beta''$-$Al_2O_3$ Powders. Mat. Res. Bull., vol. 15, pp. 1517-1524. Oct. 1980.
"Chimie Minerale.-Sur les proprietes d'un nouvel aluminate de sodium $NaAl_3O_8$", Academie Des Sciences, Comptes Rendus, Jeanine Thery et al., vol. 254, No. 3, 1962, pp. 2782-2684.
Japanese Journal of Applied Physics, "Ionic Conduction of Impurity-Doped $\beta$-Alumina Ceramics" by Atsuo Imai and Mituo Harata, vol. 11, No. 2, pp. 180-185, Feb. 1972.
ID State Ionics 13, "Spinel Block Doping and Conductivity of Sodium Beta"-Alumina Ceramics" by Friederich Herbach, pp. 53-61, 1984.
Silicates Industriels 1986/5-6, "Sodium Beta"-Alumina Ceramics: Compositions, Phases, Conductives(*)" by Friedrich Harbach, pp. 81-85.

Primary Examiner—Mark L. Bell
Assistant Examiner—C. M. Bonner
Attorney, Agent, or Firm—Parkhurst, Wendel & Rossi

[57] ABSTRACT

A process for manufacturing MgO-based $\beta''$-alumina sintered bodies from a starting powder comprising an MgO-based $\beta''$-alumina as a main ingredient, through shaping and firing, in which process shaped bodies before firing contain 0.3~5 wt. %, preferably 1~3 wt. %, of Na aluminate. The resulting sintered bodies are high in density, ionic conductivity and strength and useful for solid electrolytes, for example, of sodium sulfur cells.

4 Claims, 1 Drawing Sheet

MANUFACTURE OF MGO-BASED BETA"-ALUMINA SINTERED BODIES

BACKGROUND OF THE INVENTION

1. Field of the Invention

The present invention relates to a process for manufacturing MgO-based $\beta''$-alumina sintered bodies, specifically, such sintered bodies with high density and ionic conductivity.

2. Related Art Statement

The MgO-based $\beta''$-alumina sintered bodies are ceramics to be used as a solid electrolyte, for example, for sodium-sulfur cells or the like. These sintered bodies have hitherto been manufactured by shaping a mixed starting powder comprising $Al_2O_3$, $Na_2CO_3$, MgO and the like components or, $\beta$- or $\beta''$-alumina powder previously synthesized by firing such a mixed starting powder, and then firing the resulting shaped bodies.

Namely, Japanese Patent Publication No. 8842/'77 discloses a manufacturing process of $\beta''$-alumina sintered bodies wherein $Al_2O_3$, sodium aluminate and MgO are mixed together, shaped and then fired. Alternatively, in Japanese Journal of Applied Physics, Vol. 11, No. 2, pp. 180–185 (1972) is described a process wherein $\beta$-alumina powder is admixed with $Na_2CO_3$ and MgO and provisionally fired to provide a $\beta''$-alumina-$\beta$-alumina mixed powder which is then shaped and fired. Furthermore, in Solid State Ionics, Vol. 13, 53-61 (1984) is described a process wherein $Al_2O_3$, $Na_2CO_3$ and an MgO-$Al_2O_3$ reaction product are mixed together and provisionally fired to provide a $\beta''$-alumina-$\beta$-alumina mixed powder which is then shaped and fired.

As shown in Solid State Ionics, Vol.13, 53-61 (1984) and also in Silicates Industries, 81-85 (1986), the MgO-based $\beta''$-alumina, when it has a composition close to 87 wt. % $Al_2O_3$ 4.5 wt. % MgO and 8.5 wt. % $Na_2O$, can be provided with a $\beta''$-alumina phase having a high ionic conductivity. However, according to conventional processes, a difficulty has been encountered in the manufacture of $\beta''$-alumina sintered bodies of such a high conductive composition, because sintering is hardly effected due to grain growth occurring during the course of manufacture.

SUMMARY OF THE INVENTION

Therefore, in view of the above difficulty of the conventional processes, the object of the present invention is to provide dense MgO-based $\beta''$-alumina sintered bodies comprising a $\beta''$-alumina phase having a highly ionically conductive composition, without grain growth occurring.

The present invention is, in processes for manufacturing MgO-based $\beta''$-alumina sintered bodies wherein a starting powder comprising an MgO-based $\beta''$-alumina as a main ingredient is shaped and fired, a process characterized in that shaped bodies before firing contain sodium aluminate in an amount of 0.3~5%, preferably 1~3%, by weight.

BRIEF DESCRIPTION OF THE DRAWING

The present invention will be explained in more detail hereinafter by way of example with reference to the appended drawing.

DETAILED DESCRIPTION OF THE INVENTION

Figure 1:
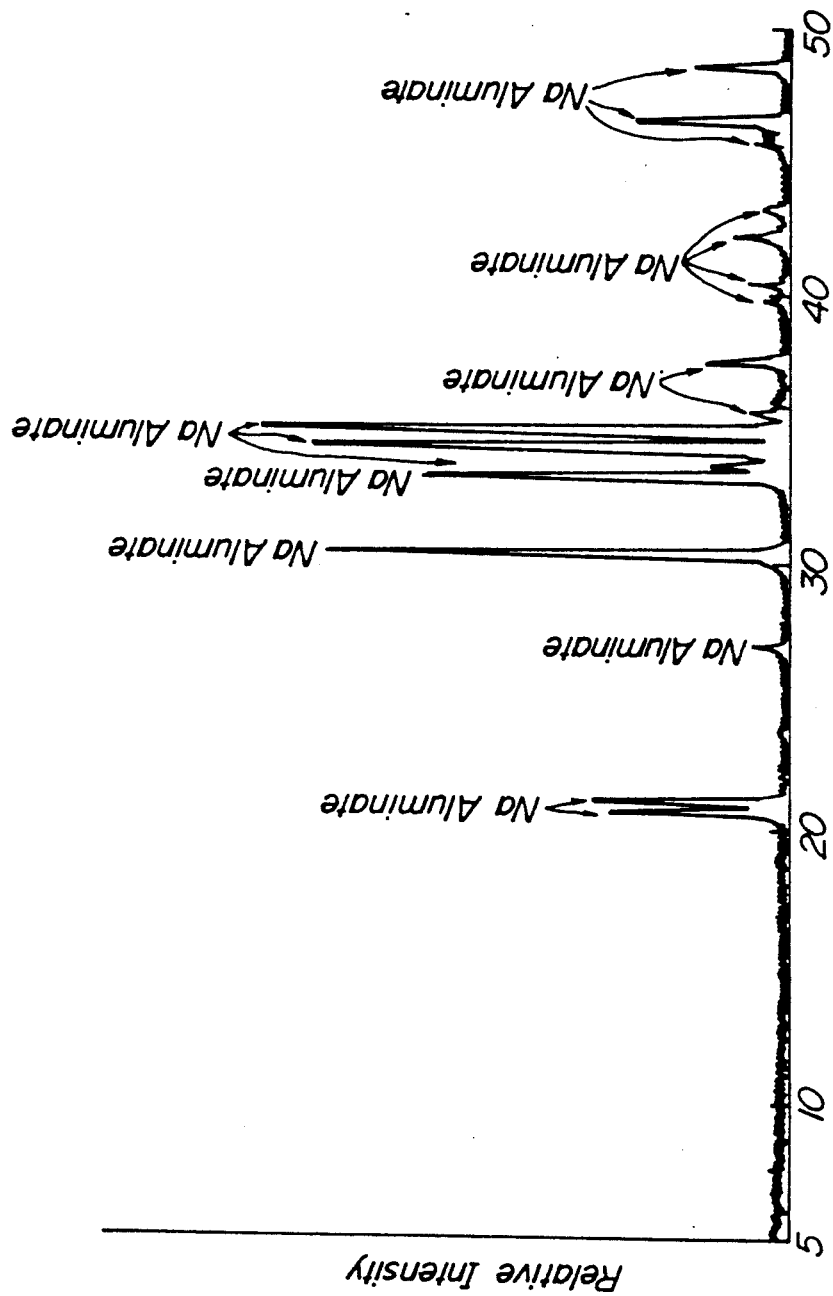
FIG. 1 is an example of an X-ray diffraction pattern by CuK$\alpha$-ray, of sodium aluminate.

The process for manufacturing MgO-based $\beta''$-alumina sintered bodies according to the present invention comprises the steps of: admixing a predetermined amount of sodium aluminate with an MgO-based $\beta''$-alumina powder previously synthesized by firing a mixture of $Al_2O_3$, $Na_2CO_3$, MgO and the like components; and then firing the resulting mixed powder, or the steps of: synthesizing an MgO-based $\beta''$-alumina powder containing sodium aluminate, utilizing heterogeneous compositions, firing conditions or the like; and then firing the resulting powder.

On the outset, the $\beta''$-alumina powder employed as a starting powder is synthesized by mixing the components: $Al_2O_3$, $Na_2CO_3$, MgO and the like, and provisionally firing the obtained mixture. The starting powder may contain not more than 50% by weight of $\beta$-alumina, not more than 5% by weight of unreacted $\alpha$-$Al_2O_3$ or the like. Further, sodium aluminate is obtained by mixing an Na source, such as $Na_2CO_3$, NaOH or the like, with an Al source, such as $Al_2O_3$, $AlCl_3$ or the like, at a predetermined molar ratio, and provisionally firing the resulting mixture at 800°~1,500° C. The sodium aluminate may be a solid solution with MgO. An example of an X-ray diffraction pattern by CuK$\alpha$-ray of sodium aluminate is shown in FIG. 1.

The $\alpha''$-alumina powder and a predetermined amount of sodium aluminate are mixed together and homogenized, using a ball mill, vibrating mill or the like, shaped into a desired shape by means of a hydrostatic press, slip-casting or the like, and then fired at 1,500° C. or more under a protective atmosphere for restraining Na from vaporization.

Alternatively, when the $\beta''$-alumina powder is synthesized, if the starting powders, mixing process, provisional-firing conditions, provisional-firing time and the like and combination thereof are previously selected and controlled through a preliminary experiment, for example, an uneven mixing is adopted to form localized $Na_2O$-rich portions or the provisional-firing condition is controlled to form a predetermined amount of sodium aluminate together with $\beta''$-alumina during provisional-firing, so that a $\beta''$-alumina powder containing sodium aluminate may be synthesized, the manufacturing process can be further simplified because the previous synthesis of sodium aluminate to be added may not be necessitated.

Additionally, even if sodium aluminate is not contained during shaping, it may also be formed in the course of firing before commencement of sintering.

The MgO-based $\beta''$-alumina powder to be used as a main component of the starting powder may have a chemical composition that has been controlled to yield $\beta''$-alumina sintered bodies having a chemical composition of 85.0~89.0 wt. % $Al_2O_3$, 3.0~5.5 wt. % MgO and 7.5~10.0 wt. % $Na_2O$ and the major portion of the constituent phases being a $\beta''$-alumina phase, taking a composition change caused by 0.3~5 wt. % of sodium aluminate contained before sintering, the vaporization of the Na component during sintering or the like, into consideration. Particularly, if an MgO-based $\beta''$-alumina powder having a chemical composition to yield $\beta''$-alumina sintered bodies having a chemical composition of 86.0~88.0 wt. % $Al_2O_3$, 3.5~5.0 wt. % MgO and 8.0~9.5 wt. % $Na_2O$ is employed, $\beta''$-alumina sintered bodies having better in ionic conductivity can be obtained. Additionally, the β"-alumina sintered bodies may contain at most 10% by weight of a β-alumina phase.

Preferred examples of the present invention will be shown hereinafter.

EXAMPLE 1

An β-alumina powder of a 99.9% or more purity, an $Na_2CO_3$ powder and an MgO powder were compounded at the compositions shown in Table 1, mixed in a vibrating mill and then provisionally fired at 1,300° C. for 5 hours to synthesize β"-alumina starting powders Nos. 1-3. The synthesized β"-alumina starting powders Nos. 1-3 had the same chemical composition as the composition of the compounded powder and a crystal phase comprising a β"-alumina phase and a β-alumina phase. Alternatively, an α-alumina powder of a 99.9% or more purity and a $Na_2CO_3$ powder were compounded at a molar ratio of 1:1, mixed in a ball mill and then provisionally fired at 1,200° C. for 2 hours to synthesize a sodium aluminate starting powder.

In FIG. 1, the X-ray diffraction pattern by CuKα-ray of this sodium aluminate starting powder is shown.

In the next place, each of the thus synthesized β"-alumina starting powders Nos. 1-3 was admixed with the sodium aluminate starting powder at the percentages shown in Table 2, mixed in a ball mill, granulated with a spray dryer and preformed with a metal mold into a preform having a dimension of 30 mm diameter × 10 mm thickness. Then, the preform was pressed with a hydrostatic pressure of 2.5 tons/cm² and put into an MgO crucible. As the crucible was lidded to protect the atmosphere, firing was conducted at the temperatures and for the times shown in Table 2 to provide the MgO-based β"-alumina sintered bodies shown in Examples Nos. 1-10 which are according to the process of the invention for manufacturing MgO-based β"-alumina sintered bodies.

On the other hand, the β"-alumina starting powders Nos. 1-3 alone and each of the β"-alumina starting powders Nos. 1-3 admixed with the sodium aluminate starting powder at the percentages shown in Comparative Examples Nos. 1-8 on Table 2 were pulverized in a ball mill, granulated and preformed with a metal mold into a preform having a dimension of 3 mm diameter × 10 mm thickness. Then, the preform was pressed with a hydrostatic pressure of 2.5 tons/cm² and put into an MgO crucible. As the crucible was lidded to protect the atmosphere, firing was conducted at the temperatures and for the times shown in Table 2 to provide the MgO-based β"-alumina sintered bodies shown in Comparative Examples Nos. 1-8.

Of the MgO-based β"-alumina sintered bodies obtained in Examples Nos. 1-10 and Comparative Examples Nos. 1-8, the chemical composition, bulk density, crystal phase, ionic conductivity according to the alternating current four-terminal method, and four-point flexural strength according to JIS-1601R were determined, respectively. The results are shown in Table 2. As shown in Table 2, in Examples of the present invention wherein a predetermined amount of sodium aluminate was admixed with the β"-alumina starting powder, denser sintered bodies were obtained as compared with Comparative Examples. These sintered bodies were found to exhibit high ionic conductivity and strength.

EXAMPLE 2

An β-alumina powder of a 99.9% or more purity, an $Na_2CO_3$ powder and an MgO powder were compounded at the compositions shown in Table 1, Nos. 4-6. According to the starting powders, mixing process and provisional-firing conditions previously determined through a preliminary experiment, the above starting powder was mixed in a ball mill and then provisionally fired at 1,200° C. for 2 hours to synthesize β"-alumina starting powders Nos. 4-6. The synthesized β"-alumina starting powders Nos. 4-6 had the same chemical composition as the composition of the compounded powder and a crystal phase comprising a β"-alumina phase, a β-alumina phase and sodium aluminate described in Table 1. Furthermore, the sodium aluminate content can be found by a calibration curve prepared from the diffraction intensity of sodium aluminate and that of β"-alumina or β-alumina in the X-ray diffraction pattern by CuKα-ray.

In the next place, each of the thus synthesized, sodium aluminate-containing β"-alumina starting powders Nos. 4-6 was pulverized in a ball mill in the same manner as Example 1, granulated with a spray dryer and preformed with a metal mold to a preform having a dimension of 30 mm diameter × 10 mm thickness. Then, the preform was pressed with a hydrostatic pressure of 2.5 tons/cm² and put into an MgO crucible. As the atmosphere was being protected in the crucible, firing was conducted at the temperatures and for the times shown in Table 3 to provide the MgO-based β"-alumina sintered bodies shown in Examples Nos. 11-16.

On the MgO-based β"-alumina sintered bodies obtained in Examples Nos. 11-16, the chemical composition, bulk density, crystal phase, ionic conductivity according to the alternating current four-terminal method, and four-point flexural strength according to JIS-1601R were determined, respectively. The results are shown in Table 3. As shown in Table 3, also in Examples of the present invention wherein the β"-alumina starting powder containing a predetermined amount of sodium aluminate was used, denser sintered bodies were obtained as compared with Comparative Examples Nos. 1-8. These sintered bodies exhibited high ionic conductivity and strength and, moreover, were particularly useful when used as a solid electrolyte for sodium sulfur cells.

TABLE 1

| β"-Alumina starting powder No. | $Al_2O_3$ (wt. %) | $Na_2CO_3$ calculated as $Na_2O$ (wt. %) | MgO (wt. %) | Sodium aluminate content (wt. %) |
| --- | --- | --- | --- | --- |
| 1 | 85.5 | 9.5 | 5.0 | — |
| 2 | 87.0 | 9.0 | 4.0 | — |
| 3 | 88.0 | 8.5 | 3.5 | — |
| 4 | 85.5 | 10.0 | 4.5 | 2.8 |
| 5 | 87.0 | 9.5 | 3.5 | 1.2 |
| 6 | 88.0 | 9.0 | 3.0 | 3.8 |

TABLE 2

| No. | β"-Alumina starting powder composition No. | β"-Alumina Percentage (wt. %) | Na aluminate Percentage (wt. %) | Firing temperature (°C.) | Firing time (hr.) | Chemical composition Al₂O₃ (wt. %) | Chemical composition Na₂O (wt. %) | Chemical composition MgO (wt. %) | Bulk density (g/cm³) | Crystal phase | Ionic conductivity (/Ωcm) | Four-point flexural strength (MPa) |
|---|---|---|---|---|---|---|---|---|---|---|---|---|
| Example 1 | 1 | 99.7 | 0.3 | 1600 | 1.0 | 85.6 | 9.2 | 5.2 | 3.20 | β">>NA | 0.23 | 260 |
| Example 2 | 1 | 99.0 | 1.0 | 1650 | 0.5 | 85.3 | 9.4 | 5.3 | 3.22 | β">>NA | 0.21 | 250 |
| Example 3 | 1 | 97.0 | 3.0 | 1550 | 2.0 | 85.1 | 9.9 | 5.0 | 3.23 | β">>NA | 0.20 | 280 |
| Example 4 | 2 | 99.7 | 0.3 | 1600 | 1.0 | 86.9 | 8.7 | 4.3 | 3.19 | β" | 0.30 | 230 |
| Example 5 | 2 | 99.0 | 1.0 | 1650 | 0.5 | 86.8 | 8.9 | 4.3 | 3.20 | β" | 0.27 | 240 |
| Example 6 | 2 | 97.0 | 3.0 | 1600 | 1.0 | 86.4 | 9.5 | 4.1 | 3.21 | β" | 0.26 | 240 |
| Example 7 | 2 | 95.0 | 5.0 | 1600 | 1.0 | 85.9 | 10.1 | 4.0 | 3.23 | β">>NA | 0.23 | 250 |
| Example 8 | 3 | 99.7 | 0.3 | 1600 | 1.0 | 88.0 | 8.3 | 3.7 | 3.18 | β" | 0.26 | 210 |
| Example 9 | 3 | 97.0 | 3.0 | 1600 | 1.0 | 87.5 | 8.9 | 3.6 | 3.22 | β" | 0.26 | 260 |
| Example 10 | 3 | 95.0 | 5.0 | 1550 | 2.0 | 87.1 | 9.6 | 3.3 | 3.19 | β">β>>NA | 0.22 | 230 |
| Comparative Example 1 | 1 | 100.0 | 0.0 | 1600 | 1.0 | 85.6 | 9.1 | 5.3 | 2.89 | β">>NA | 0.13 | 130 |
| Comparative Example 2 | 1 | 99.9 | 0.1 | 1650 | 0.5 | 85.7 | 9.0 | 5.3 | 2.92 | β">>NA | 0.12 | 150 |
| Comparative Example 3 | 2 | 100.0 | 0.0 | 1600 | 1.0 | 87.1 | 8.6 | 4.3 | 2.91 | β" | 0.13 | 170 |
| Comparative Example 4 | 2 | 99.9 | 0.1 | 1650 | 0.5 | 86.9 | 8.7 | 4.4 | 2.95 | β" | 0.13 | 160 |
| Comparative Example 5 | 2 | 94.0 | 6.0 | 1550 | 2.0 | 85.7 | 10.3 | 4.0 | 3.23 | β">>NA | 0.16 | 230 |
| Comparative Example 6 | 3 | 100.0 | 0.0 | 1600 | 1.0 | 88.2 | 8.1 | 3.7 | 2.97 | β">>NA | 0.13 | 160 |
| Comparative Example 7 | 3 | 99.9 | 0.1 | 1550 | 2.0 | 88.3 | 8.0 | 3.7 | 2.78 | β">>NA | 0.10 | 90 |
| Comparative Example 8 | 3 | 94.0 | 6.0 | 1600 | 2.0 | 86.9 | 9.9 | 3.2 | 3.21 | β">>NA | 0.15 | 240 |

(Note) NA: NaAlO₂

TABLE 3

| No. | β"-Alumina starting powder No. | Firing temperature (°C.) | Firing time (hr.) | Chemical composition Al₂O₃ (wt. %) | Chemical composition Na₂O (wt. %) | Chemical composition MgO (wt. %) | Bulk density (g/cm³) | Crystal phase | Ionic conductivity (/Ωcm) | Four-point flexural strength (MPa) |
|---|---|---|---|---|---|---|---|---|---|---|
| Example 11 | 4 | 1600 | 1.0 | 85.6 | 9.6 | 4.8 | 3.21 | β">>NA | 0.23 | 240 |
| Example 12 | 4 | 1650 | 0.5 | 85.7 | 9.7 | 4.6 | 3.23 | β">>NA | 0.23 | 230 |
| Example 13 | 5 | 1550 | 2.0 | 87.2 | 9.1 | 3.7 | 3.21 | β" | 0.30 | 230 |
| Example 14 | 5 | 1600 | 1.0 | 87.1 | 8.3 | 3.6 | 3.18 | β" | 0.28 | 220 |
| Example 15 | 6 | 1650 | 0.5 | 88.2 | 8.6 | 3.2 | 3.22 | β">>NA | 0.28 | 260 |
| Example 16 | 6 | 1600 | 1.0 | 88.4 | 8.5 | 3.1 | 3.19 | β">>NA | 0.26 | 240 |

(Note) Na: NaAlO₂

According to the process of the invention having the above-described structure, inclusion of a predetermined amount of sodium aluminate displays an effect of restraining the grain growth, promoting the densification or the like. Thus, with relatively hard-densifiable β"-alumina starting powders, for example, to yield sintered bodies having a chemical composition of 86.0~88.0 wt. % $Al_2O_3$ 3.5~5.0 wt. % MgO and 8.0~9.5 wt. % $Na_2O$, or even with β"-alumina starting powders hardly densifiable irrespective of the composition, dense β"-alumina sintered bodies can be obtained with no abnormal grain growth occurring.

Sodium aluminate contained in the MgO-based β"-alumina powder during shaping is reacted with the β"alumina powder during firing and decreases or eventually vanishes. However, in order to improve the sinterability of the MgO-based β"-alumina powders, a sodium aluminate is required to be contained in the powders in an amount of at least 0.3 wt. % and when it is 1 wt. % or more, a particularly excellent effect will be obtained. The characteristics, specifically the ionic conductivity and flexural strength, of the obtained sintered bodies are appreciably improved when the sodium aluminate content in the powders is increased up to about 3 wt. %. However, if the MgO-based β"-alumina powder contains sodium aluminate in an amount exceeding about 5 wt. %, an excessive sodium aluminate will remain in sintered bodies and deteriorate characteristics such as ionic conductivity or the like, so that the sodium aluminate content in MgO-based β"-alumina powders should be at most 5 wt. %.

As explained above, according to the process of the invention for manufacturing MgO-based $\beta''$-alumina sintered bodies, wherein an MgO-based $\beta''$-alumina powder containing sodium aluminate in an amount of 3~5%, preferably 1~3%, by weight, is shaped and fired, dense MgO-based $\beta$--alumina sintered bodies of high ionic conductivity and high strength can be obtained. The thus obtained MgO-based $\beta''$-alumina sintered bodies can be particularly effectively applied to solid electrolytes for sodium sulfur cells or the like.

Accordingly, as is clear from the above explanation, the present invention will largely contribute towards industrial progress as a manufacturing process of MgO-based $\beta''$-alumina sintered bodies, clearing away problems of the past.

What is claimed is:

1. A method of producing an MgO-based $\beta''$-alumina sintered body, comprising the steps of:

shaping a starting powder comprising MgO-based $\beta''$-alumina and 0.3~5.0 wt. % of sodium aluminate into a body; and firing the shaped body to produce a sintered body.

2. The method of claim 1, wherein the amount of sodium aluminate is 1.0-3.0 wt. %.

3. The method of claim 1, wherein the shaped body is fired at a temperature ranging from 1550°-1650° C. for 0.5-2.0 hours.

4. The method of claim 1, wherein the sintered body has an ionic conductivity ranging from 0.20-0.30/$\Omega$cm and a four-point flexural strength ranging from 210-280 MPa.

* * * * *